(12) United States Patent
Kushnir et al.

(10) Patent No.: US 12,078,747 B2
(45) Date of Patent: Sep. 3, 2024

(54) METHOD AND APPARATUS FOR GENERATING FREQUENCY MODULATED CONTINUOUS WAVE SIGNAL

(71) Applicant: Apple Inc., Cupertino, CA (US)

(72) Inventors: Igal Kushnir, Hod-Hasharon (IL); Elan Banin, Raanana M (IL); Rotem Banin, Even-Yehuda (IL); Ofir Degani, Nes-Ammin (IL); Ashoke Ravi, Portland, OR (US)

(73) Assignee: Apple Inc., Cupertino, CA (US)

( * ) Notice: Subject to any disclaimer, the term of this patent is extended or adjusted under 35 U.S.C. 154(b) by 461 days.

(21) Appl. No.: 17/433,323

(22) PCT Filed: Mar. 12, 2019

(86) PCT No.: PCT/US2019/021740
§ 371 (c)(1),
(2) Date: Aug. 24, 2021

(87) PCT Pub. No.: WO2020/185213
PCT Pub. Date: Sep. 17, 2020

(65) Prior Publication Data
US 2022/0057480 A1    Feb. 24, 2022

(51) Int. Cl.
*G01S 7/35*    (2006.01)
*G01S 13/58*    (2006.01)
*G01S 13/931*    (2020.01)

(52) U.S. Cl.
CPC .............. *G01S 7/35* (2013.01); *G01S 13/584* (2013.01); *G01S 13/931* (2013.01)

(58) Field of Classification Search
CPC ....................................................... G01S 7/35
See application file for complete search history.

(56) References Cited

U.S. PATENT DOCUMENTS 8,222,965 B1 *   7/2012   Juneau ................. H03C 3/0941
                                                 332/127
2010/0073222 A1   3/2010   Mitomo et al.
(Continued)

FOREIGN PATENT DOCUMENTS

KR    1020180013261 A    2/2018

OTHER PUBLICATIONS

International Search Report and Written Opinion for International Application No. PCT/US2019/021740, date mailed Dec. 12, 2019, 9 pgs.
(Continued)

*Primary Examiner* — Marcus E Windrich
(74) *Attorney, Agent, or Firm* — Kowert, Hood, Munyon, Rankin & Goetzel, P.C.

(57) ABSTRACT

A method and apparatus for generating a frequency-modulated continuous wave (FMCW) signal. The apparatus may include a first oscillator configured to generate a first oscillation signal, a frequency modulator configured to generate a frequency-modulated oscillation signal from the first oscillation signal based on a sequence of control words, a frequency modulation code generator configured to generate a sequence of frequency modulation codes for generating an FMCW waveform, and a frequency multiplier configured to generate the FMCW signal by up-converting the frequency-modulated oscillation signal. The sequence of control words is generated based on the sequence of frequency modulation codes. The apparatus may include a second oscillator configured to generate a second oscillation signal, and a phase detector configured to detect a phase difference between the first oscillation signal and the second oscillation signal and generate an offset code based on the phase difference. The frequency modulator may be a digital-to-time converter.

20 Claims, 5 Drawing Sheets

(56) References Cited

U.S. PATENT DOCUMENTS

| | | | |
|---|---|---|---|
| 2010/0245160 A1* | 9/2010 | Sakurai | G01S 7/4008 |
| | | | 342/200 |
| 2011/0227785 A1* | 9/2011 | Sakurai | G01S 13/345 |
| | | | 342/200 |
| 2013/0050013 A1* | 2/2013 | Kobayashi | G01S 13/343 |
| | | | 327/156 |
| 2015/0015431 A1* | 1/2015 | Trotta | G01S 7/03 |
| | | | 342/21 |
| 2015/0130653 A1 | 5/2015 | Shiraishi et al. | |
| 2019/0260617 A1* | 8/2019 | Ott | H03C 3/095 |

OTHER PUBLICATIONS

International Preliminary Report on Patentability for International Application No. PCT/US2019/021740, date mailed May 7, 2021, 9 pgs.

\* cited by examiner

METHOD AND APPARATUS FOR GENERATING FREQUENCY MODULATED CONTINUOUS WAVE SIGNAL

This application is a U.S. National Stage filing of International Application No. PCT/US2019/021740, filed Mar. 12, 2019, titled "METHOD AND APPARATUS FOR GENERATING FREQUENCY MODULATED CONTINUOUS WAVE SIGNAL", which is incorporated herein by reference in its entirety.

FIELD

Examples relate to a method and apparatus for generating a frequency modulated continuous wave (FMCW) signal, more particularly a method and apparatus for generating configurable and linearized FMCW radar chirp signal.

BACKGROUND

An FMCW radar is a special type of radar which radiates a continuous transmission power. In contrast to a continuous wave (CW) radar, an FMCW radar can change its operating frequency during the measurement. The transmission signal is modulated in frequency or in phase. This allows the FMCW radar to measure a target range in addition to a target velocity.

In order to improve range and velocity resolution, radars use wide bandwidth signals at high frequencies. However, there is a technical challenge in producing this type of frequency-modulated signal with good frequency accuracy and low phase noise.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

An FMCW signal may be generated with a phase-locked loop (PLL)-based chirp generator or an in-phase/quadrature (IQ) chirp generator. The PLL-based chirp generator has a limited frequency deviation rate (chip slope) due to multiple modulus divider (MMD) update rate in analog PLL, and due to a frequency update rate in digital PLL. The IQ chirp generator generates a chirp signal in baseband and up-converts to radio frequency (RF). These solutions cannot provide a linear chirp, a low phase noise, and a high chirp rate. Generating a chirp signal with IQ baseband system requires high speed digital circuitry and a digital-to-analog converter (DAC), leading to high power consumption. Furthermore, this system has frequency dependent I/Q errors.

Examples are disclosed for a method and apparatus for generating a configurable FMCW signal with low distortion, low phase noise, and wide bandwidth.

Figure 1:
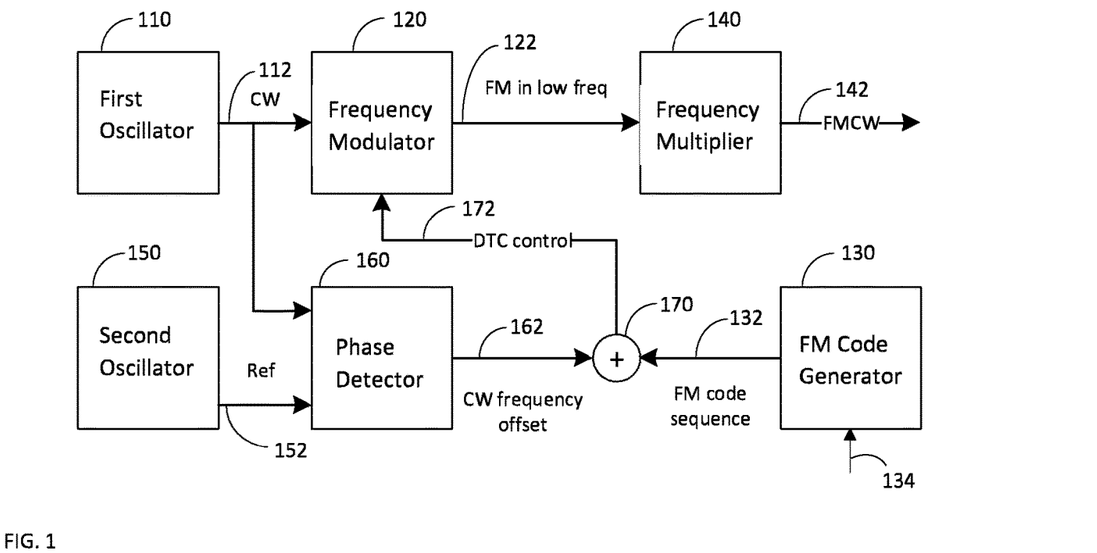
FIG. 1 is a block diagram of an FMCW signal generator in accordance with one example.
Figure 2:
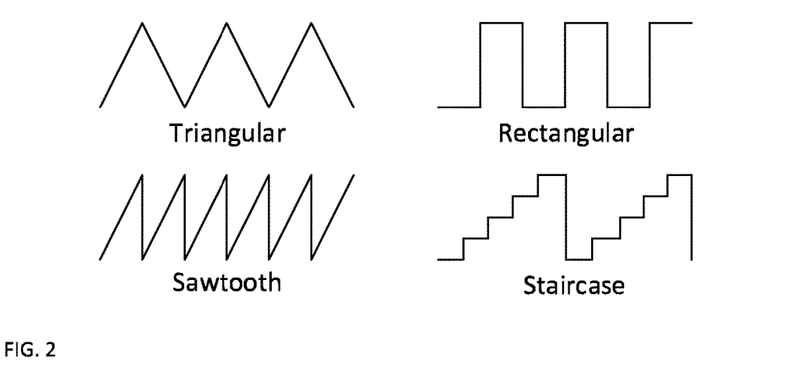
FIG. 2 shows some examples of frequency modulation patterns for FMCW signals.

FIG. 1 is a block diagram of an FMCW signal generator 100 in accordance with one example. The FMCW signal generator 100 generates an FMCW signal, (e.g. a chirp). A chirp is a sinusoid whose frequency increases or decreases linearly over time. FIG. 2 shows some examples of frequency modulation patterns for FMCW signals. FMCW signals may be in a pattern of triangular, rectangular, sawtooth, staircase, or the like. In FIG. 2, the horizontal direction represents time and the vertical direction represents frequency of the signal. The frequency of the FMCW signal increases or decreases, or changes periodically in a certain pattern. The FMCW signal generator 100 may be used for an FMCW radar, such as an automotive FMCW radar.

The FMCW signal generator 100 includes a first oscillator 110, a frequency modulator 120, a frequency modulation (FM) code generator 130, and a frequency multiplier 140.

The first oscillator 110 is configured to generate a first oscillation signal 112. The first oscillator 110 may be a low phase noise clock generator. The first oscillator 110 may provide a single frequency with a very low phase noise. For example, the first oscillator 110 may include a high quality (high Q) resonator.

The first oscillation signal 112 from the first oscillator 110 drives the frequency modulator 120. The frequency modulator 120 is configured to generate a frequency-modulated oscillation signal 122 (in low frequency) from the first oscillation signal 112 based on a sequence of control words 172. The frequency modulator 120 receives the first oscillation signal 112 from the first oscillator 110 and generates the frequency-modulated oscillation signal 122 based on the control words. The frequency modulator 120 modulates the first oscillation signal in a way that the frequency increases or decreases or changes periodically in accordance with a pattern of the FMCW signal to be generated.

The frequency modulator 120 may be a digital-to-time converter (DTC). A DTC is a device that generates an output signal with a variable delay controlled by the control words 172. The frequency modulator 120 (e.g. a DTC) may perform two functions. The frequency modulator 120 may add a frequency modulation to the first oscillation signal 112 and also correct a frequency error in the first oscillation signal 112 based on the control words 172. The DTC implements frequency modulation by shifting a phase of each (rising) edge of the first oscillation signal 112 based on the control words 172. For example, the frequency modulation may be implemented by progressively increasing or decreasing the amount of phase shifts of the pulses of the first oscillation signal 112. A shunt-capacitor inverter-based DTC, a current-starved inverter-based DTC, a voltage comparator-based DTC, a phase interpolation-based DTC, or any conventional DTC may be used.

The frequency modulation code generator 130 is configured to generate a sequence of frequency modulation codes 132 for a specific FMCW waveform. The sequence of control words 172 used in the frequency modulator 120 is generated based on the sequence of frequency modulation codes 132. The frequency modulation code generator 130 is a configurable digital block that can choose the type of frequency modulation (e.g. an FMCW pattern as shown in FIG. 2). The frequency modulation code generator 130 generates or determines the sequence of frequency modulation codes 132 in a way that the phases of the input pulses (the first oscillation signal) to the frequency modulator 120 are shifted by a progressively increasing or decreasing amount (e.g., 0, 1, 2, 4, 8, 16, . . . ) or changing in a specific pattern for frequency modulation for a specific FMCW waveform.

The frequency multiplier 140 is configured to generate a high-frequency FMCW signal based on the frequency-modulated oscillation signal 122. The frequency multiplier 140 may up-convert the frequency-modulated oscillation signal 122 to a higher frequency. The frequency-modulated oscillation signal 122 is fed to the frequency multiplier 140 as a reference signal in generating the FMCW signal 142. The frequency multiplier 140 may be a wideband phase-locked loop (PLL). A PLL is a closed-loop frequency-control system based on the phase difference between the input clock signal and the feedback clock signal of a controlled oscillator. A phase frequency detector (PFD) in the PLL detects the difference in phase and frequency between the reference clock signal and the feedback clock signal and generates an "up" or "down" control signal based on whether the feedback frequency is lagging or leading the reference frequency, and these control signals control the VCO until the input clock signal and the feedback signal are locked in phase. The PLL may be an analog PLL or a digital PLL. The frequency multiplier 140 may be an integer digital PLL (DPLL) in which case the frequency of the FMCW signal 142 is an integer-multiple of the frequency of the frequency-modulated oscillation signal 122. Alternatively, the frequency multiplier 140 may be a fractional DPLL, in which case the frequency of the FMCW signal 142 is a fractional-multiple of the frequency of the frequency-modulated oscillation signal 122. Alternatively, any other type of frequency multiplier may be used.

The FMCW signal generator 100 may include a second oscillator 150, a phase detector 160, and a combiner 170. The second oscillator 150 is configured to generate a second oscillation signal 152. The second oscillator 150 provides a reference clock signal for the first oscillator 110. The second oscillator 150 exhibits high frequency accuracy. The second oscillator 150 has a higher frequency accuracy than the first oscillator 110. For example, the frequency accuracy of the second oscillator 150 may be at least ten, hundred, or thousand times higher than the frequency accuracy of the first oscillator 110. For example, the second oscillator 150 may be a crystal oscillator. Alternatively, the second oscillator 150 may be a micro electro mechanical system (MEMS) resonator, a piezoelectric resonator, an electrostatic resonator or a printed resonator.

The second oscillation signal 152 generated by the second oscillator 150 serves as a high accuracy reference for the first oscillator 110. Since the high Q resonator (the first oscillator 110) may have high frequency variations over process, voltage, and temperature (PVT) variations, a reference clock from the second oscillator 150 (e.g. a crystal oscillator) may be used to correct the frequency variations of the first oscillator 110.

The first oscillation signal 112 and the second oscillation signal 152 are fed to the phase detector 160. The phase detector 160 is configured to detect a phase difference between the first oscillation signal 112 and the second oscillation signal 152 and generate an offset code 162 based on the phase difference. The offset code 162 is sent to the frequency modulator 120 as a negative feedback for correcting the frequency errors in the first oscillation signal 112. The phase detector 160 may function as a narrow bandwidth PLL for correcting the frequency errors in the first oscillation signal 112 (in the DTC). Since the high-Q resonator (i.e. the first oscillator) has high frequency variation over PVT, a reference clock from a more accurate clock (e.g. a crystal) may be used to correct the frequency variations of the first oscillator 110.

The phase detector 160 may be a time-to-digital converter (TDC). A TDC is a device that quantizes time intervals between two or more consecutive timing events and converts them to digital values. A TDC detects the phase difference between the first oscillation signal 112 and the second oscillation signal 152 and outputs an offset code 162 corresponding to the detected phase difference. A delay line TDC, a Vernier TDC, a gated-ring oscillator TDC, or any conventional TDC may be used.

As an alternative example, the phase detector 160 may include a counter(s). The counter may count clocks of one of the first oscillator 110 or the second oscillator 150 for one or more clock cycles of the other. For example, the counter may count the clock cycles of the second oscillator 150 during one (or more) clock cycle(s) of the first oscillator 110, and the phase difference between the first oscillation signal 112 and the second oscillation signal 152 may be estimated based on the counting. The offset code 162 corresponding to the estimated phase difference is then generated.

The sequence of control words 172 for controlling the frequency modulator 120 may be generated by combining, by the combiner 170, the offset code 162 and the sequence of frequency modulation codes 132 generated or determined by the frequency modulation code generator 130. The sequence of control words 172 is sent to the frequency modulator 120 and the frequency-modulated oscillation signal 122 is generated based on the sequence of control words 172.

Using the two clock sources, i.e. the first oscillator 110 having a low phase noise and the second oscillator 150 having a high frequency accuracy, a frequency-modulated oscillation signal 122 may be generated with a high frequency accuracy (e.g. vs. PVT) as well as a desired low level of phase noise. By utilizing the first oscillation signal 112 and the second oscillation signal 152, the frequency modulator 120 may generate the frequency-modulated oscillation signal 122 at high frequency and high quality. In particular, the frequency-modulated oscillation signal 122 may exhibit a high frequency accuracy and a low level of phase noise. The frequency-modulated oscillation signal 122 is fed to the frequency multiplier 140 as a high frequency, high quality reference in generating the FMCW signal 142.

The frequency multiplier 140 (e.g. iDPLL) has a configurable output frequency so that the frequency of the oscillation signal is adjustable. The use of the optimized iDPLL together with the high frequency, high quality reference signal may allow to achieve very low phase noise and reduced spurs in the oscillation signal.

In accordance with some examples disclosed herein, due to the use of a DTC, the frequency multiplier 140 can be simplified to an integer PLL which is simpler and smaller, consumes less power, and has fewer impairments than fractional PLLs (such as fractional spurs).

Figure 3:
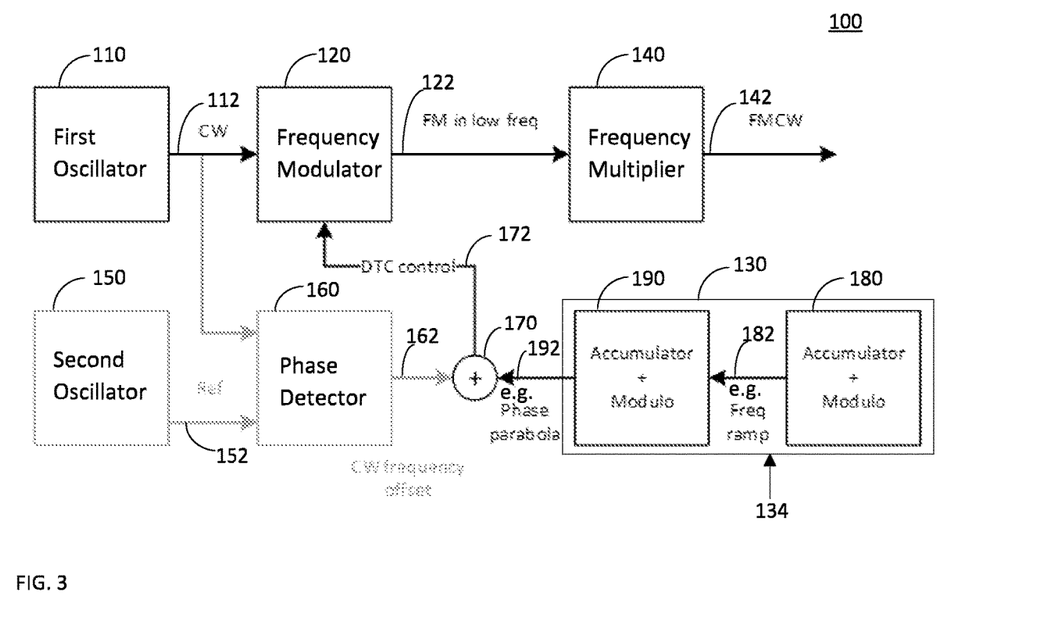
FIG. 3 illustrates an example FMCW signal generator in accordance with one example.

FIG. 3 illustrates an example FMCW signal generator 100 in accordance with one example. The structure shown in FIG. 3 is basically the same as the one shown in FIG. 1 but includes some details of the frequency modulation code generator 130. The components explained with respect to FIG. 1 will not be explained herein again for simplicity. As an example, the frequency modulation code generator 130 may include accumulators 180, 190 (including modulo operators). The first accumulator 180 may generate codes 182 representing frequency increase or decrease or changes in accordance with the FMCW waveform pattern. The second accumulator 190 may then accumulate the codes 182 output from the first accumulator 180. The output 192 from the second accumulator 190 may be then combined with the offset code 162 from the phase detector 160 to generate the sequence of control words.

Figure 4:
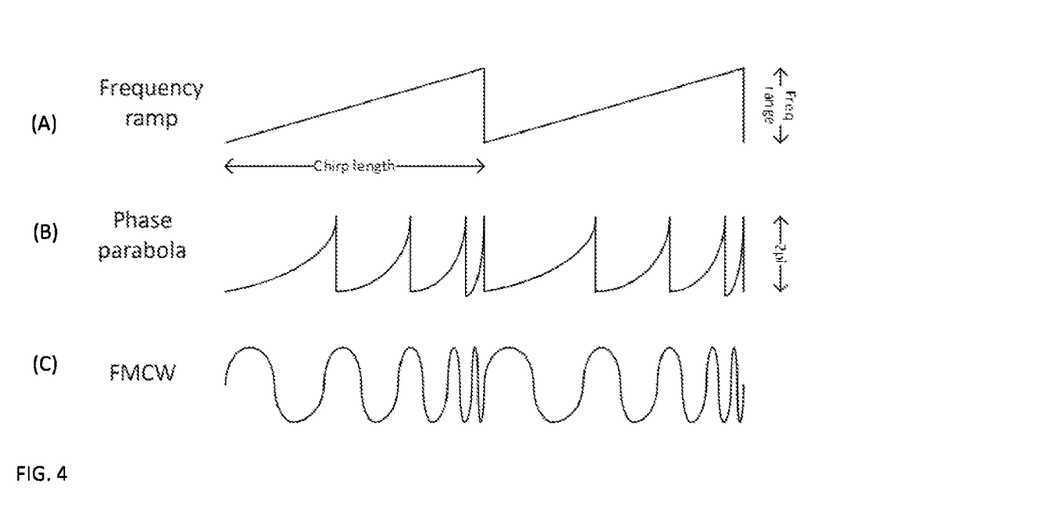
FIGS. 4A-4C show example signal patterns generated by the accumulators and the frequency multiplier for a sawtooth FMCW pattern as an example.

FIGS. 4A-4C shows example signal patterns generated by the accumulators 180, 190 and the frequency multiplier 140 for a sawtooth FMCW pattern as an example. FIG. 4A shows the pattern of the output codes 182 from the first accumulator 180 that follows the sawtooth pattern. In this example, the first accumulator 180 accumulates an input value over time, until it reaches the frequency range limit, which then wraps over by the modulo operation. FIG. 4B shows the pattern of the output codes 192 from the second accumulator 190 representing the phase changes (phase parabola in this example) to be incurred in the frequency-modulated oscillation signal 122 at the frequency modulator 120. The output of the first accumulator 180 is accumulated by the second accumulator 190, which is reset every a by the modulo operator. FIG. 4C shows the FMCW signal waveform generated by the frequency multiplier 140 (e.g. iPLL) for the sawtooth pattern. For different FMCW waveforms, the frequency modulation code generator may be implemented differently.

Using a DTC provides a full control of the FMCW signal shape. Different FMCW signal shapes may be preferable for different tasks (e.g. range accuracy vs. velocity accuracy in automotive radar). With the examples disclosed herein it is possible to switch or toggle among different FMCW patterns, for example remotely. The frequency modulation code generator 130 may switch or toggle the sequence of frequency modulation codes based on a control signal 134.

In another example, pre-distortion may be performed in generation of the frequency-modulated oscillation signal 122. For example, a PLL may exhibit non-linearity depending on the bandwidth and the dynamics of the PLL circuitry, etc. At higher frequencies such as 70 GHz for automotive radar, a PLL may respond non-linearly. In order to correct the non-linearity of the PLL, the non-linear response of the PLL may be measured in advance and the input signal (i.e. the frequency-modulated oscillation signal 122) to the frequency multiplier 140 may be pre-distorted to counteract the non-linearity. The frequency modulation code generator 130 may impose pre-distortion in the sequence of frequency modulation codes 132 to correct the non-linearity of the PLL or any RF chain distortions.

The FMCW signal generator in accordance with examples disclosed herein can generate multiple types of FMCW signals for different use cases including ultra-wide bandwidth chirps. The FMCW signal generator in accordance with examples disclosed herein has a good phase noise due to the use of high Q resonator and integer PLL. The FMCW signal generator in accordance with examples disclosed herein has a minimal signal distortion in PLL due to wide bandwidth and digital pre-distortion implemented with the DTC.

The FMCW signal generator in accordance with examples disclosed herein provides a significant advantage in manufacturing radars, such as automotive radars. Radars based on the FMCW signal generator in accordance with examples disclosed herein would have a better phase noise, lower distortion, and lower power consumption.

Figure 5:
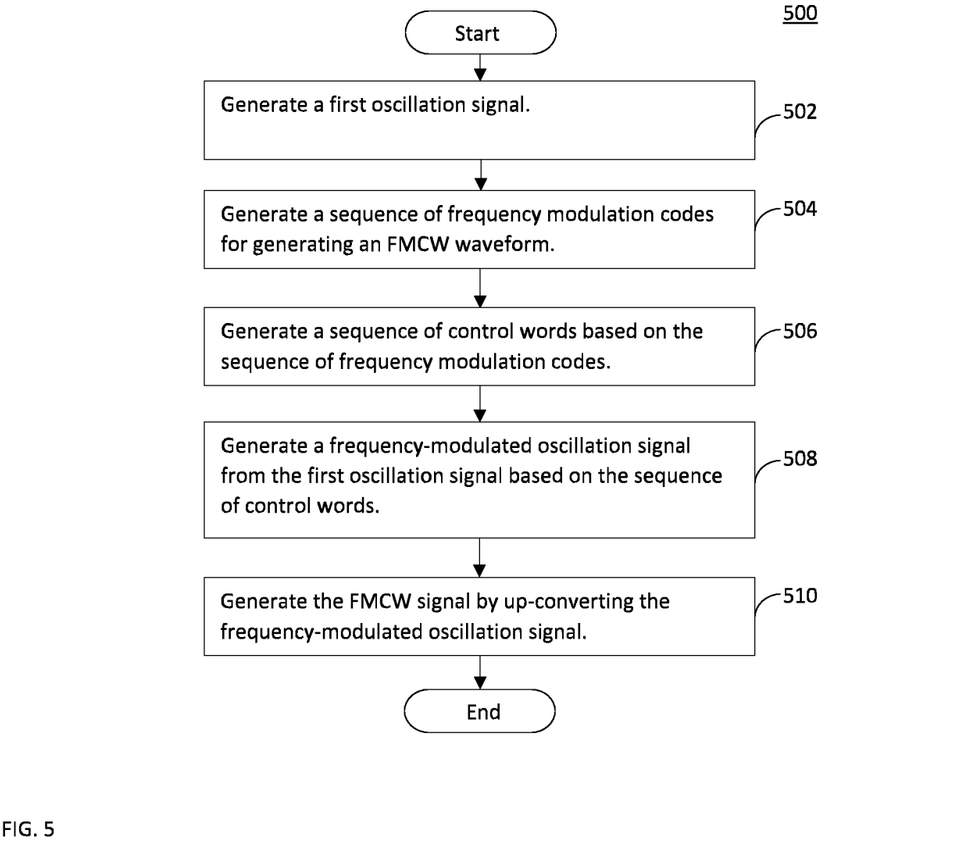
FIG. 5 is a flow diagram of a process of generating an FMCW signal in accordance with one example.

FIG. 5 is a flow diagram of a process 500 of generating an FMCW signal in accordance with one example. A first oscillation signal is generated using a first oscillator (502). A sequence of frequency modulation codes is generated for generating an FMCW waveform (504). A sequence of control words is generated based on the sequence of frequency modulation codes (506). A frequency-modulated oscillation signal is generated from the first oscillation signal based on the sequence of control words (508). An FMCW signal is generated by up-converting the frequency-modulated oscillation signal (510). The process may further include that a second oscillation signal is generated using a second oscillator. The second oscillation signal has a higher frequency accuracy than the first oscillation signal. A phase difference between the first oscillation signal and the second oscillation signal may be determined and an offset code is generated based on the phase difference. The sequence of control words is generated by combining the offset code and the sequence of frequency modulation codes.

Figure 6:
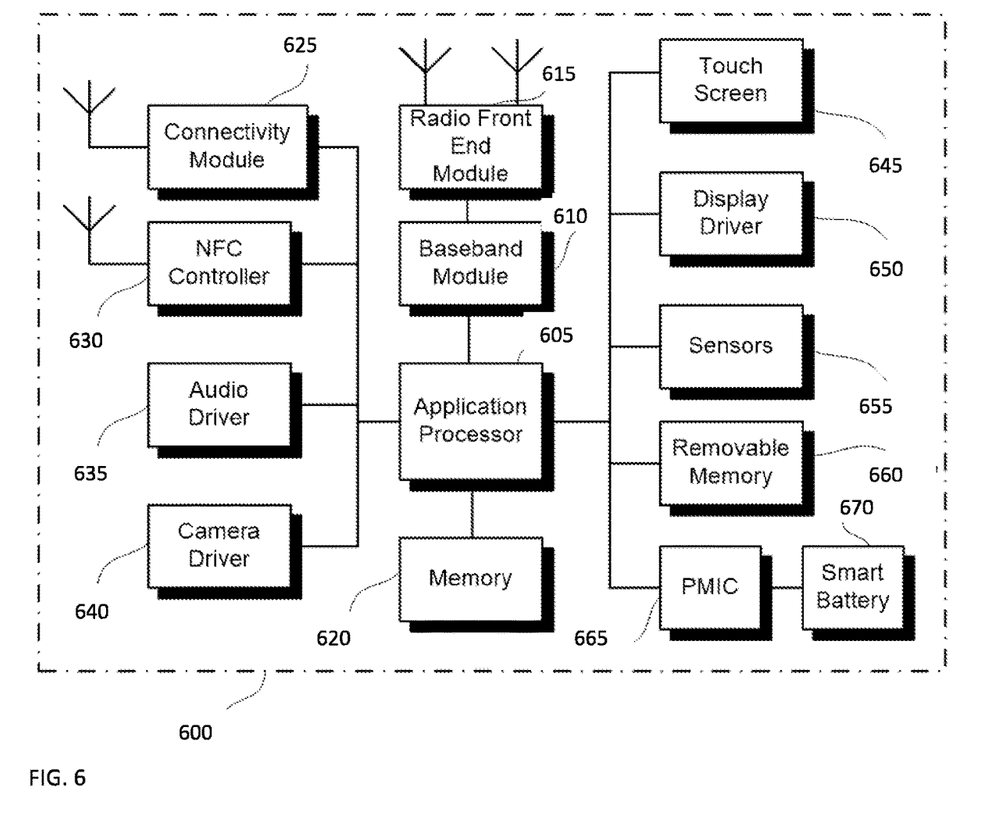
FIG. 6 illustrates a user device in which the examples disclosed herein may be implemented.

FIG. 6 illustrates a user device 600 in which the examples disclosed herein may be implemented. The user device 600 may be a mobile device in some aspects and includes an application processor 605, baseband processor 610 (also referred to as a baseband module), radio front end module (RFEM) 615, memory 620, connectivity module 625, near field communication (NFC) controller 630, audio driver 635, camera driver 640, touch screen 645, display driver 650, sensors 655, removable memory 660, power management integrated circuit (PMIC) 665 and smart battery 670.

In some aspects, application processor 605 may include, for example, one or more CPU cores and one or more of cache memory, low drop-out voltage regulators (LDOs), interrupt controllers, serial interfaces such as serial peripheral interface (SPI), inter-integrated circuit (I²C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 610 may be implemented, for example, as a solder-down substrate including one or more integrated circuits, a single packaged integrated circuit soldered to a main circuit board, and/or a multi-chip module containing two or more integrated circuits.

Figure 7:
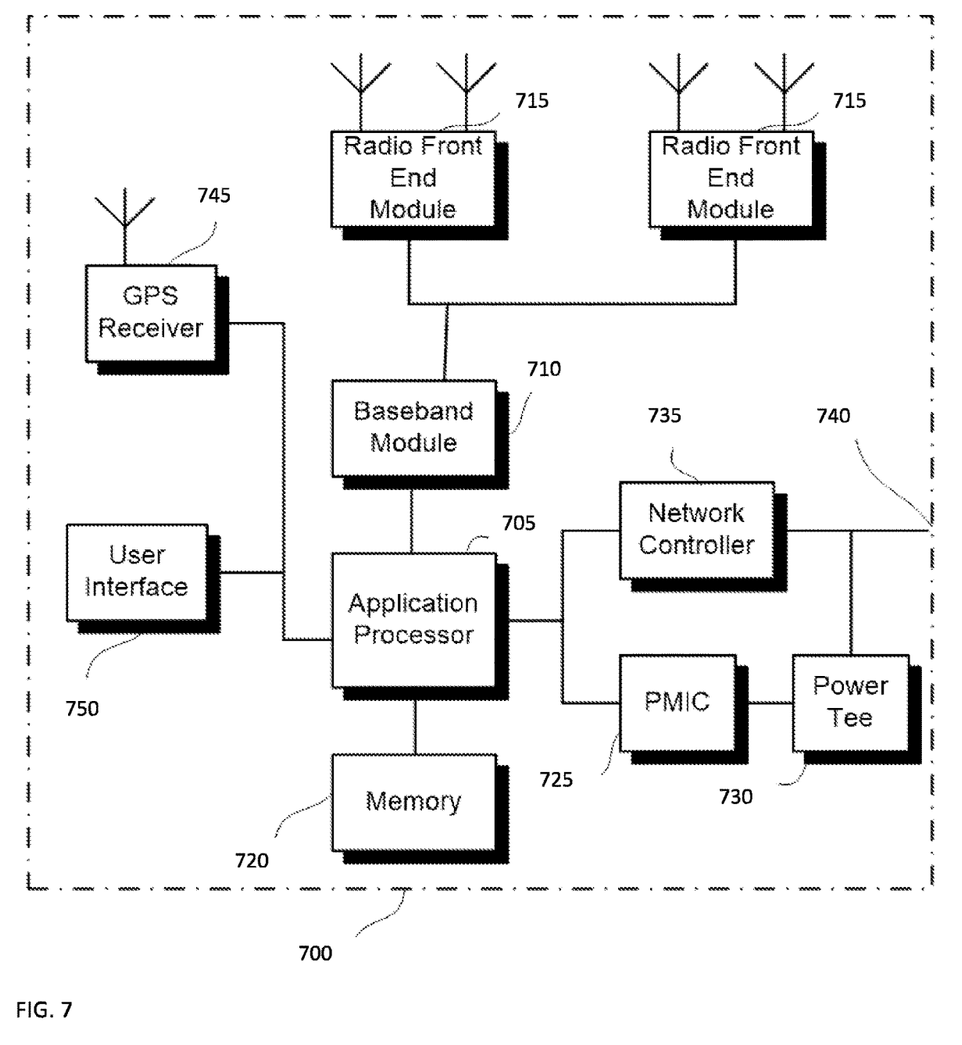
FIG. 7 illustrates a base station or infrastructure equipment radio head in which the examples disclosed herein may be implemented.

FIG. 7 illustrates a base station or infrastructure equipment radio head 700 in which the examples disclosed herein may be implemented. The base station radio head 700 may include one or more of application processor 705, baseband modules 710, one or more radio front end modules 715, memory 720, power management circuitry 725, power tee circuitry 730, network controller 735, network interface connector 740, satellite navigation receiver module 745, and user interface 750.

In some aspects, application processor 705 may include one or more CPU cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 710 may be implemented, for example, as a solder-down substrate including one or more integrated circuits, a single packaged integrated circuit soldered to a main circuit board or a multi-chip module containing two or more integrated circuits.

In some aspects, memory 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto resistive random access memory (MRAM) and/or a three-dimensional crosspoint memory. Memory 720 may be implemented as one or more of solder down packaged integrated circuits, socketed memory modules and plug-in memory cards.

In some aspects, power management integrated circuitry 725 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 730 may provide for electrical power drawn from a network cable to provide both power supply and data connectivity to the base station radio head 700 using a single cable.

In some aspects, network controller 735 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 745 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 745 may provide data to application processor 705 which may include one or more of position data or time data. Application processor 705 may use time data to synchronize operations with other radio base stations.

In some aspects, user interface 750 may include one or more of physical or virtual buttons, such as a reset button, one or more indicators such as light emitting diodes (LEDs) and a display screen.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is an apparatus for generating an FMCW signal. The apparatus includes a first oscillator configured to generate a first oscillation signal, a frequency modulation code generator configured to generate a sequence of frequency modulation codes for generating an FMCW waveform, a frequency modulator configured to generate a frequency-modulated oscillation signal from the first oscillation signal based on a sequence of control words, wherein the sequence of control words is generated based on the sequence of frequency modulation codes, and a frequency multiplier configured to generate the FMCW signal by up-converting the frequency-modulated oscillation signal.

Example 2 is the apparatus of example 1, further comprising a second oscillator configured to generate a second oscillation signal, wherein the second oscillation signal comprises a higher frequency accuracy than the first oscillation signal, and a phase detector configured to detect a phase difference between the first oscillation signal and the second oscillation signal and generate an offset code based on the phase difference, wherein the sequence of control words is generated by combining the offset code and the sequence of frequency modulation codes.

Example 3 is the apparatus as in any one of examples 1-2, wherein the frequency modulator is a DTC.

Example 4 is the apparatus as in any one of examples 1-3, wherein the frequency modulation code generator is configured to add pre-distortion in generating the sequence of frequency modulation codes.

Example 5 is the apparatus of example 4, wherein the frequency modulation code generator is configured to add the pre-distortion to counteract a non-linearity of the frequency multiplier.

Example 6 is the apparatus as in any one of examples 1-5, wherein the frequency modulation code generator includes a first accumulator configured to generate a sequence of codes for a frequency pattern of the configured FMCW waveform and a second accumulator configured to accumulate an output of the first accumulator to generate the sequence of frequency modulation codes.

Example 7 is the apparatus as in any one of examples 1-6, wherein the frequency modulation code generator is configured to generate the sequence of frequency modulation codes in accordance with a control signal, wherein the FMCW waveform is switched based on the control signal.

Example 8 is the apparatus as in any one of examples 2-7, wherein the phase detector is a TDC.

Example 9 is the apparatus as in any one of examples 2-8, wherein the phase detector is a counter configured to count clock cycles of the first oscillator over one or more clock cycle of the second oscillator.

Example 10 is the apparatus as in any one of examples 1-9, wherein the frequency multiplier is an integer digital phase-locked loop.

Example 11 is the apparatus as in any one of examples 1-10, wherein the first oscillator is a high-Q resonator and wherein the second oscillator is a crystal oscillator.

Example 12 is a method for generating an FMCW signal. The method includes generating a first oscillation signal, generating a sequence of frequency modulation codes for generating an FMCW waveform, generating a sequence of control words based on the sequence of frequency modulation codes, generating a frequency-modulated oscillation signal from the first oscillation signal based on the sequence of control words, and generating the FMCW signal by up-converting the frequency-modulated oscillation signal.

Example 13 is the method of example 12, further comprising generating a second oscillation signal, wherein the second oscillation signal comprises a higher frequency accuracy than the first oscillation signal, detecting a phase difference between the first oscillation signal and the second oscillation signal, and generating an offset code based on the phase difference, wherein the sequence of control words is generated by combining the offset code and the sequence of frequency modulation codes.

Example 14 is the method as in any one of examples 12-13, wherein the frequency-modulated oscillation signal is generated by a DTC.

Example 15 is the method as in any one of examples 12-14, further comprising adding pre-distortion in generating the sequence of frequency modulation codes to counteract a non-linearity of a frequency multiplier that generates the FMCW signal.

Example 16 is an apparatus for generating an FMCW signal. The apparatus includes a means for generating a first oscillation signal, a means for generating a sequence of frequency modulation codes for generating an FMCW waveform, a means for generating a sequence of control words based on the sequence of frequency modulation codes, a means for generating a frequency-modulated oscillation signal from the first oscillation signal based on the sequence of control words, and a means for generating the FMCW signal by up-converting the frequency-modulated oscillation signal.

Example 17 is the apparatus of example 16 further comprising a means for generating a second oscillation signal, wherein the second oscillation signal comprises a higher frequency accuracy than the first oscillation signal, a means for detecting a phase difference between the first oscillation signal and the second oscillation signal, and a means for generating an offset code based on the phase difference, wherein the sequence of control words is generated by combining the offset code and the sequence of frequency modulation codes.

Example 18 is the apparatus as in any one of examples 16-17, wherein the means for generating the frequency-modulated oscillation signal comprises a DTC.

Example 19 is the apparatus as in any one of examples 16-18, further comprising a means for adding pre-distortion in generating the sequence of frequency modulation codes to counteract a non-linearity of the means for generating the FMCW signal.

Example 20 is the apparatus as in any one of examples 17-19, wherein the means for detecting the phase difference comprises a TDC.

Example 21 is a machine-readable storage including machine readable instructions, when executed, to implement a method or realize an apparatus as in any one of examples 1-20. The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus, comprising:
    a first oscillator configured to generate a first oscillation signal;
    a frequency modulation code generator configured to generate a sequence of frequency modulation codes for generating a frequency-modulated continuous wave (FMCW) waveform;
    a second oscillator configured to generate a second oscillation signal, wherein the second oscillation signal has a higher frequency accuracy than the first oscillation signal;
    a phase detector configured to detect a phase difference between the first oscillation signal and the second oscillation signal and generate an offset code based on the phase difference, wherein the offset code corrects frequency errors in the first oscillation signal with respect to the second oscillation signal;
    a frequency modulator configured to generate a frequency-modulated oscillation signal from the first oscillation signal based on a sequence of control words, wherein the sequence of control words is generated based on combining the sequence of frequency modulation codes and the offset code; and
    a frequency multiplier configured to generate a FMCW signal by up-converting the frequency-modulated oscillation signal.

2. The apparatus of claim 1, wherein the frequency modulator is a digital-to-time converter (DTC).

3. The apparatus of claim 1, wherein the frequency modulation code generator is configured to add pre-distortion in generating the sequence of frequency modulation codes.

4. The apparatus of claim 3, wherein the frequency modulation code generator is configured to add the pre-distortion to counteract a non-linearity of the frequency multiplier.

5. The apparatus of claim 1, wherein the frequency modulation code generator includes a first accumulator configured to generate a sequence of codes for a frequency pattern of the configured FMCW waveform and a second accumulator configured to accumulate an output of the first accumulator to generate the sequence of frequency modulation codes.

6. The apparatus of claim 1, wherein the frequency modulation code generator is configured to generate the sequence of frequency modulation codes in accordance with a control signal, wherein the FMCW waveform is switched based on the control signal.

7. The apparatus of claim 1, wherein the phase detector is a time-to-digital converter (TDC).

8. The apparatus of claim 1, wherein the phase detector is a counter configured to count clock cycles of the first oscillator over one or more clock cycle of the second oscillator.

9. The apparatus of claim 1, wherein the frequency multiplier is an integer digital phase-locked loop.

10. The apparatus of claim 1, wherein the first oscillator is a high-Q resonator and wherein the second oscillator is a crystal oscillator.

11. A method, comprising:
    generating a first oscillation signal;
    generating a sequence of frequency modulation codes for generating a frequency-modulated continuous wave (FMCW) waveform;
    generating a second oscillation signal, wherein the second oscillation signal has a higher frequency accuracy than the first oscillation signal;
    detecting a phase difference between the first oscillation signal and the second oscillation signal;
    generating an offset code based on the phase difference, wherein the offset code corrects frequency errors in the first oscillation signal with respect to the second oscillation signal;
    generating a sequence of control words based on combining the sequence of frequency modulation codes and the offset code;

generating a frequency-modulated oscillation signal from the first oscillation signal based on the sequence of control words; and generating a FMCW signal by up-converting the frequency-modulated oscillation signal.

12. The method of claim 11, wherein the frequency-modulated oscillation signal is generated by a digital-to-time converter (DTC).

13. The method of claim 11 further comprising:

adding pre-distortion in generating the sequence of frequency modulation codes to counteract a non-linearity of a frequency multiplier that generates the FMCW signal.

14. A baseband processor, comprising:

memory storing instructions that, when executed, cause a user device to:

generate a first oscillation signal;

generate a sequence of frequency modulation codes for generating a frequency-modulated continuous wave (FMCW) waveform;

generate a second oscillation signal, wherein the second oscillation signal has a higher frequency accuracy than the first oscillation signal;

detect a phase difference between the first oscillation signal and the second oscillation signal;

generate an offset code based on the phase difference, wherein the offset code corrects frequency errors in the first oscillation signal with respect to the second oscillation signal;

generate a sequence of control words based on combining the sequence of frequency modulation codes and the offset code;

generate a frequency-modulated oscillation signal from the first oscillation signal based on the sequence of control words; and generate a FMCW signal by up-converting the frequency-modulated oscillation signal.

15. The baseband processor of claim 14, wherein generating the frequency-modulated oscillation signal comprises using a digital-to-time converter (DTC).

16. The baseband processor of claim 14, wherein the instructions are further executable to cause the user device to:

add pre-distortion in generating the sequence of frequency modulation codes to counteract a non-linearity in generating the FMCW signal.

17. The baseband processor of claim 14, wherein detecting the phase difference comprises using a time-to-digital converter (TDC).

18. The baseband processor of claim 14, wherein the sequence of frequency modulation codes is generated in accordance with a control signal, and wherein the FMCW waveform is switched based on the control signal.

19. The baseband processor of claim 14, wherein detecting the phase difference is performed using a phase detector, wherein the phase detector is a counter configured to count clock cycles of the first oscillator over one or more clock cycle of the second oscillator.

20. The baseband processor of claim 14, wherein generating the FMCW signal by up-converting the frequency-modulated oscillation signal is performed using a frequency multiplier, and wherein the frequency multiplier is an integer digital phase-locked loop.

* * * * *